(12) United States Patent
Okazaki (10) Patent No.: US 6,521,368 B2
(45) Date of Patent: Feb. 18, 2003

(54) FUEL CELL

(75) Inventor: Hiroshi Okazaki, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 227 days.

(21) Appl. No.: 09/778,865

(22) Filed: Feb. 8, 2001

(65) Prior Publication Data

US 2001/0018143 A1 Aug. 30, 2001

(30) Foreign Application Priority Data

Feb. 29, 2000 (JP) .......................... 2000-054242

(51) Int. Cl.[7] .................. H01M 2/00; H01M 8/04; H01M 8/10
(52) U.S. Cl. ............... 429/34; 429/30; 429/38; 429/39; 429/12; 429/26; 429/32; 429/37
(58) Field of Search ............... 429/34, 30, 38, 429/39, 12, 26, 32, 37

(56) References Cited

U.S. PATENT DOCUMENTS 6,066,409 A * 5/2000 Ronne et al. .................. 429/39
6,413,664 B1 * 7/2002 Wilkinson et al. ............ 429/34

FOREIGN PATENT DOCUMENTS

| JP | 9-92324 | 4/1997 |
| JP | 9-266007 | 10/1997 |

* cited by examiner

*Primary Examiner*—Patrick Ryan
*Assistant Examiner*—Angela J. Martin
(74) *Attorney, Agent, or Firm*—Oblon, Spivak, McClelland, Maier & Neustadt, P.C.

(57) ABSTRACT

A fuel cell is formed as a stack of a plurality of unit cells, each unit cell including an electrode unit held by separators, each electrode unit including a solid polymer electrolyte membrane held by a pair of electrodes. Fluid passages extend through the stack in a stacking direction of the stack. An insulating supply-discharge member having a fluid passage communicates with at least one of the fluid passages extending through the stack. A current collection member is held between the supply-discharge member and the stack. An isolating element is positioned to fluidically isolate the current collection member from a fluid in the fluid passage of the supply-discharge member and from the fluid passages extending through the stack. The fuel cell has high reliability and high generating efficiency, and can be produced at low cost.

22 Claims, 6 Drawing Sheets

FUEL CELL

INCORPORATION BY REFERENCE

The disclosure of Japanese Patent Application Nos. 2000-054242 filed on Feb. 29, 2000 including the specification, drawings and abstract is incorporated herein by reference in their entirety.

BACKGROUND OF THE INVENTION

1. Field of the Invention

This invention relates to a fuel cell having high reliability and high electricity generating efficiency. This invention also relates to a fuel cell having high cost performance due to an improved assembling process.

2. Description of the Background

Air pollution caused by exhaust gas from automobiles is a serious problem. Various types of electric vehicles have been introduced to reduce exhaust gas from automobiles. Yet electric vehicles have not been popular due to, for example, the necessity of frequent power charges and insufficient cruise range.

Recently, automobiles employing fuel cells have gotten a lot of attention due to these environmental concerns. Such fuel cells generate electricity by a reverse reaction of electrolysis using hydrogen and oxygen, they do not discharge anything except water. The most promising fuel cells for onboard use are of the solid polymer electrolyte type which can be operated at low ambient temperature.

The fuel cell includes a stack of many unit cells capable of generating a desired level of power. A unit cell comprises an electrode unit and separators. The electrode unit includes an electrolyte provided between two electrodes (i.e., a fuel electrode and an oxidant electrode). Each of the separators has gas flowing conduits to supply the fuel gas or the oxidizing gas. Each electrode unit is held between two of the separators. As the electrolyte for the solid polymer electrolyte type fuel cell, a solid polymer electrolyte membrane is employed.

Gas supply manifolds and gas discharge manifolds extend in parallel to a stacking direction of the stack. The gas supply manifolds supply the fuel gas and the oxidizing gas to the gas flowing conduits of the separators. The gas discharge manifolds discharge emission from the separators. Some separators have coolant flowing conduits to keep the fuel cell within a proper temperature range. A coolant supply manifold and a coolant discharge manifold are also provided in parallel to the stacking direction of the stack in order to circulate the coolant in the coolant flowing conduits of separators.

Usually, the gas supply manifolds for fuel gas and oxidizing gas, the coolant supply manifold and the coolant discharge manifold are formed by a series of connection holes provided in circumference parts of the separators. The output power of the fuel cell is taken from current collector plates that are provided at both ends of the stack. Insulation boards are provided at the outsides of the current collector plates. Pressing members are provided at the outsides of the insulation plates so as to hold the stack by pressure to the center of the stack.

A conventional fuel cell structure is disclosed in a Japanese Patent Laid-open Publication No. H09-266007 published on Apr. 4, 1997. In this prior art, the fuel cell comprises current collector plates and output terminals. The current collector plates are disposed in parallel with the unit cells and have hole portions to form supply and discharge manifolds.

A conventional fuel cell is also disclosed in a Japanese Patent Laid-open Publication No. H09-92324 published on Oct. 7, 1997. In this prior art, the fuel cell comprises supply-discharge members and current collection plates. The supply-discharge members are provided at the center of the stacking direction of the stack. The current collection plates have no hole portions to form supply and discharge manifolds. In this prior art, the fuel gas, the oxidizing gas and the coolant are supplied and exhausted through the supply and discharge manifolds which extend from a side of the stack and perpendicular to the stacking direction of the stack.

However, the conventional fuel cell disclosed in the publication No. H09-266007 has following disadvantages. Since supply and discharge manifolds extend through the hole portions of the current collection plates, respective parts of the current collection plates are exposed to the fuel gas having a reduction property, oxidizing gas having a oxidization property, or a coolant. Thus, the material of the current collection plate has to have excellent corrosion resisting ability.

Although carbon has excellent corrosion resisting ability and is typically used for a current collection plate, it is very expensive in cost and has higher electric resistance than metal. In case the current collection plate has high electric resistance, some of the electric power generated by the fuel cell is consumed at the current collection plate. Thus, the efficiency of electric power generation falls significantly. Besides, in case the material of the current collection plate is carbon, it is very hard to connect the electric wire to the output terminal of the current collection plate. Further, the output terminal of the carbon current collection plate may easily break since carbon is fragile material.

These disadvantages may be solved by employment of the metal for the current collection plate. However, the problem of corrosion of the metal collection plate would not be solved because the exhaust gas includes water that is formed by the reaction of hydrogen and oxygen on the electrode. Further, such corrosion of the current collection plate may be enhanced by electrochemical reaction due to the electromotive force generated in the fuel cell.

To solve the corrosion problem, the current collection plate may be coated with a corrosion resistive material such as gold. However, such gold coating is expensive. Besides, the long term durability of the collection plate is lessened since it is difficult to get rid of pin holes.

As an alternative way of solving the corrosion problem, it has been thought to cover the current collection plate by a gasket that seals around the connection holes. However, it is difficult to produce this type of the fuel cell due to the complicated structure of the gasket, so that the fuel cell becomes more expensive.

The conventional fuel cell disclosed in the publication No. H09-92324 has similar disadvantages. It does not have disadvantage relating to the output electric terminal since the current collection plates are not exposed to fuel gas, oxidization gas nor coolant. However, it is necessary to employ electric conductive materials for the gas supplying and discharging parts with the connection holes that are provided at the center of the stack, as viewed in the stacking direction.

Besides, the supplying and discharging parts in this type of fuel cell have to have connection holes extending in several directions to function. Accordingly, production of this fuel cell is extremely difficult due to its complicated structure. Thus, this type of fuel cell becomes too expensive.

SUMMARY OF THE INVENTION

Accordingly, an object of this invention is to solve above conventional disadvantages and drawbacks.

A further object of this invention is to provide a new and novel structure of a fuel cell with high reliability, high electric power generation and low production cost.

To solve the aforementioned disadvantages and drawbacks, the fuel cell of this invention includes a fuel cell formed as a stack of a plurality of unit cells, each unit cell including an electrode unit held by separators, each electrode unit including a solid polymer electrolyte membrane held by a pair of electrodes. Fluid passages extend through the stack in a stacking direction of the stack. An insulating supply-discharge member having a fluid passage communicates with at least one of the fluid passages extending through the stack. A current collection member is held between the supply-discharge member and the stack. An isolating element is positioned to fluidically isolate the current collection member from a fluid in the fluid passage of the supply-discharge member and from the fluid passages extending through the stack.

Since the current collection member is isolated from the corrosive fluid, the current collection member does not corrode, so that the reliability of the fuel cell can be increased.

In addition, since the current collection member need not have a sealing member, the structure of the fuel cell can be simplified and the cost of producing the fuel cell can be reduced. Besides, since the current collection member is small, the cost for producing the fuel cell can be reduced.

According to the fuel cell of this invention, an electric output terminal which is connected with the current collection member may protrude outwardly from the fuel cell while extending through the supply-discharge member.

Since the electric output terminal protrudes outwardly from the fuel cell by extending through the supply-discharge member, the electric output terminal can be protruded outwardly from the supply-discharge member even if the electrode is surrounded by the supply and discharge member.

A metal having excellent electric conductivity may be employed for the electric output terminal as well as for the current collection member. Thus, power loss of the fuel cell can be reduced and the electric power generation efficiency can be improved.

Since the electric output terminal may be made by a metal, its electric resistance can be reduced at the contact between the electric output terminal and external circuits. Further, a reliable fuel cell may be produced due to the durability of an electric output terminal made from metal.

According to a feature of the invention, the electric output terminal protrudes outwardly from the stack in the stacking direction of the stack.

Since the electric output terminal can be arranged near the center of the current collection member, a distance between the electric output terminal and the current collection member may be reduced. Accordingly, the cost for producing the fuel cell can be reduced due to the smaller current collection member.

Further, the structure of the supply-discharge member which extends through the electric output terminal can be simplified so that the production cost of the fuel cell can be reduced.

According to the fuel cell of this invention, the fuel cell includes a supply port having a flange port, an exhaust port having another flange port. These flange ports are abutted against the supply-discharge member so as to flow the fluid through the supply port and the exhaust port. The fuel cell further comprises a pressure member for pressing the supply-discharge member toward the center of the stack and for pressing the flange ports toward the supply-discharge member.

According to this invention, the supply port, the exhaust port and the supply-discharge member can be manufactured separately. In addition, the supply port and the exhaust port can be connected to the supply passage and the discharge passage respectively. Therefore, the best materials can be selected for the supply port and the exhaust port. Further, the cost for producing the fuel cell can be reduced. Further, since the flange port can be shaped easily with a corrosive resistant material such as stainless steel, the supply port and the discharge port can be produced at low cost.

Another aspect of this invention includes the supply-discharge member which comprises a sheath portion extending through the pressure member and housing the electric output terminal.

Since the electric output terminal is in the sheath having an insulating property, a metal having high strength and high rigidity can be used as the pressure member. The electric output terminal can therefore sustain the internal pressure of the fuel cell due to the fluid supply to the fuel cell.

Still another aspect of this invention includes the pressure member which comprises a protection portion covering at least a part of the supply-discharge member.

Since the supply-discharge member is covered by the protection portion, damage to the supply-discharge member due to increased internal pressure of the fuel cell can be prevented. Accordingly, the reliability of the fuel cell can be increased.

BRIEF DESCRIPTION OF THE DRAWINGS

These and other objects and features of this invention will be more apparent and more readily appreciated from the following detailed description of the preferred embodiment of the invention with the accompanying drawings, in which.

DESCRIPTION OF THE PREFERRED EMBODIMENTS

Referring to the embodiment of the invention illustrated in FIGS. 1 through 5, a solid polymer electrolyte membrane 4 is held between two electrodes, an oxidant electrode 5 and a fuel electrode 6, so as to connect the two electrodes. The size of the solid polymer electrolyte membrane 4 is larger than that of either the oxidant electrode 5 or the fuel electrode 6. As a result, the outer peripheral portion of the solid polymer electrolyte membrane 4 protrudes from respective outer peripheries of the oxidant electrode 5 and the fuel electrode 6. An ethylene-propylene rubber gasket 7 is formed on the protruding portion of the solid polymer electrolyte membrane 4 by injection molding. An electrode unit 3 comprises the solid polymer electrolyte membrane 4, the oxidant electrode 5, the fuel electrode 6 and the gasket 7.

Figure 1:
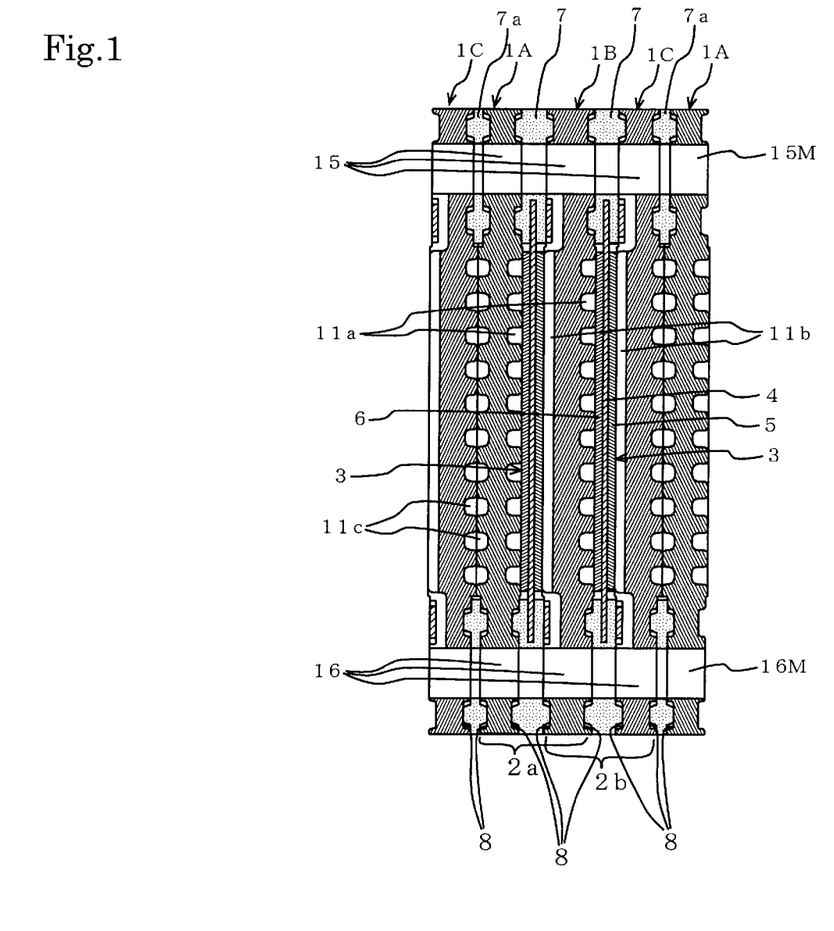
FIG. 1 is a partial cross sectional view illustrating a stack in an embodiment according to this invention.

A unit cell 2a is formed by a separator 1A, a separator 1B and an electrode unit 3. The electrode unit 3 is supported and held between the separator 1A and the separator 1B. Another unit cell 2b is also formed by the separator 1B and a separator 1C and an electrode unit 3. Each electrode unit 3 is supported and held between the separator 1B and another separator. In this embodiment, since the unit cell 2a and the unit cell 2b share the separator 1B, the fuel cell can be small in size. The stack 10 is formed by a plurality of the unit cells 2a and 2b.

One gasket 7 is supported by the separator 1A and the separator 1B. Another gasket 7 is supported by the separator 1B and the separator 1C. These gaskets 7 hermetically seal the peripheries of the separators 1A, 1B and 1C to keep the fuel gas, the oxidizing gas and the coolant inside. A gasket 7a is also disposed between the separator 1A and the separator 1C to keep the fuel gas, the oxidizing gas and the coolant inside.

Fuel gas supply conduits 11a are disposed on the separator 1A and the separator 1B respectively to flow the fuel gas between the separator 1A and the electrode unit 3, and between the separator 1B and the electrode unit 3. Oxidizing gas supply conduits 11b are disposed on the separator 1B and the separator 1C, respectively, to flow the oxidizing gas between the separator 1B and the electrode unit 3, and between the separator 1C and the electrode unit 3. There is no electrode unit 3 between the separator 1A and the separator 1C. A cooling water supply conduit 11c is disposed between the separator 1C and the separator 1A to flow cooling water.

Figure 4:
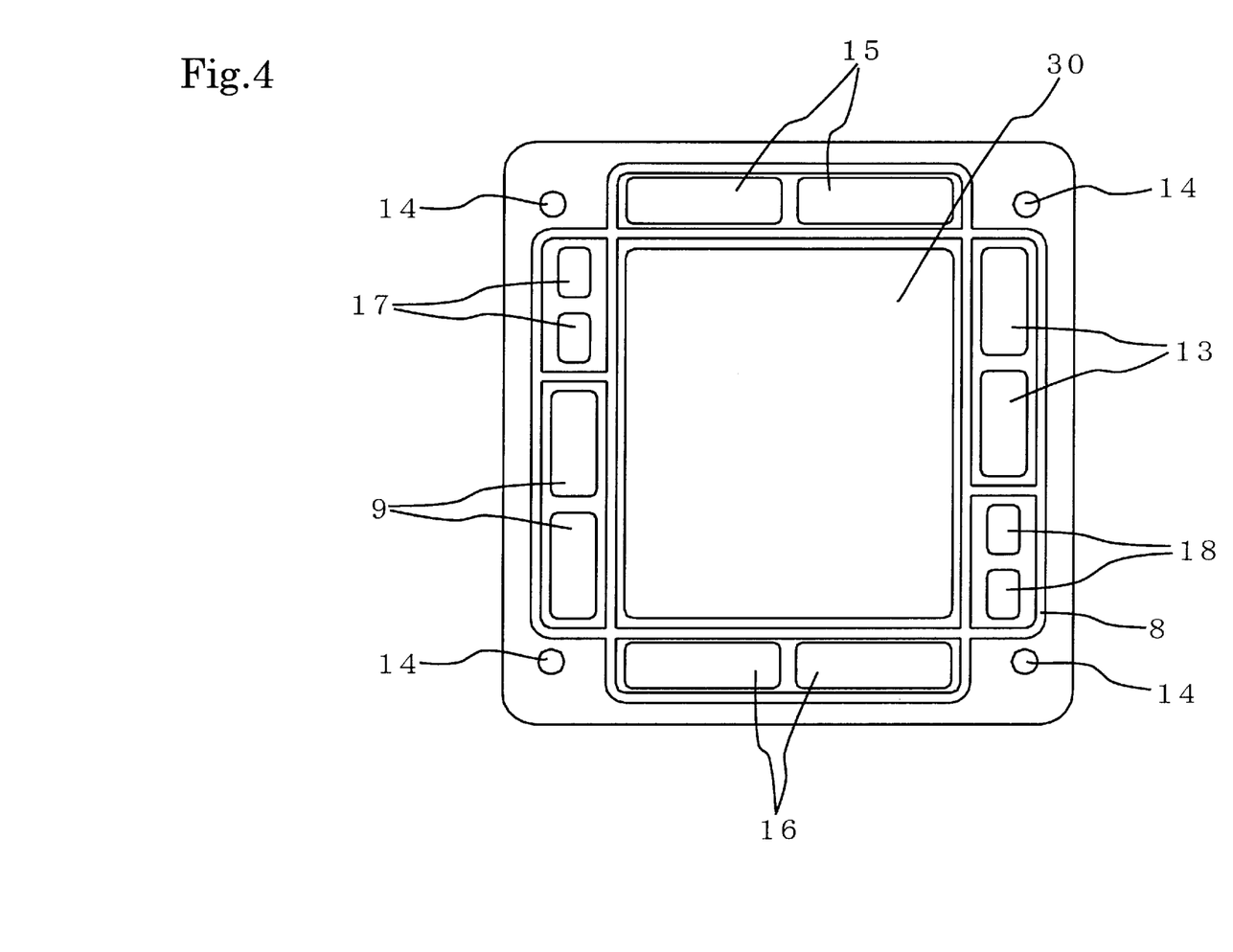
FIG. 4 is a front view of a separator that contact with a current collection plate of the embodiment of this invention viewed from the current collection plate side.

FIG. 4 is a front view of a separator 1D. Other separators 1A, 1B and 1C have the same structures of supply holes and discharge holes as does the separator 1D. On the separators 1A, 1B, 1C, 1D and the gasket 7, fuel gas supply holes 13, fuel gas discharge holes 9, oxidizing gas supply holes 15, oxidizing gas discharge holes 16, coolant supply holes 17 and coolant discharge holes 18 are provided.

The oxidizing gas supply holes 15 form an oxidizing gas supply manifold 15M when the separators are assembled in the fuel cell. The oxidizing gas supply manifold 15M is an oxidizing gas passage flowing an oxidizing gas along the stacking direction of the stack.

Similarly, the oxidizing gas discharge holes 16, the fuel gas supply holes 13, the fuel gas discharge holes 9, the coolant supply holes 17 and the coolant discharge holes 18 form an oxidizing gas discharge manifold 16M, a fuel gas supply manifold 13M, a fuel gas discharge manifold 9M, a coolant supply manifold 17M, and a coolant discharge manifold 18M when these components are assembled in the fuel cell.

Grooves 8 are provided on the separators 1A, 1B, 1C and 1D. The grooves 8 contact with protrusions of the gaskets 7 to keep the fuel gas, the oxidizing gas and the coolant inside when these components are assembled in the fuel cell. Bolt holes are provided at four corners of the separators 1A, 1B, 1C and 1D to insert bolts when these components are assembled in the fuel cell. A contact plane 30 of a current collection plate 20 is provided on the separator 1D. The contact plane is a flat plane where the current collection plate 20 is contacted therewith.

Figure 2:
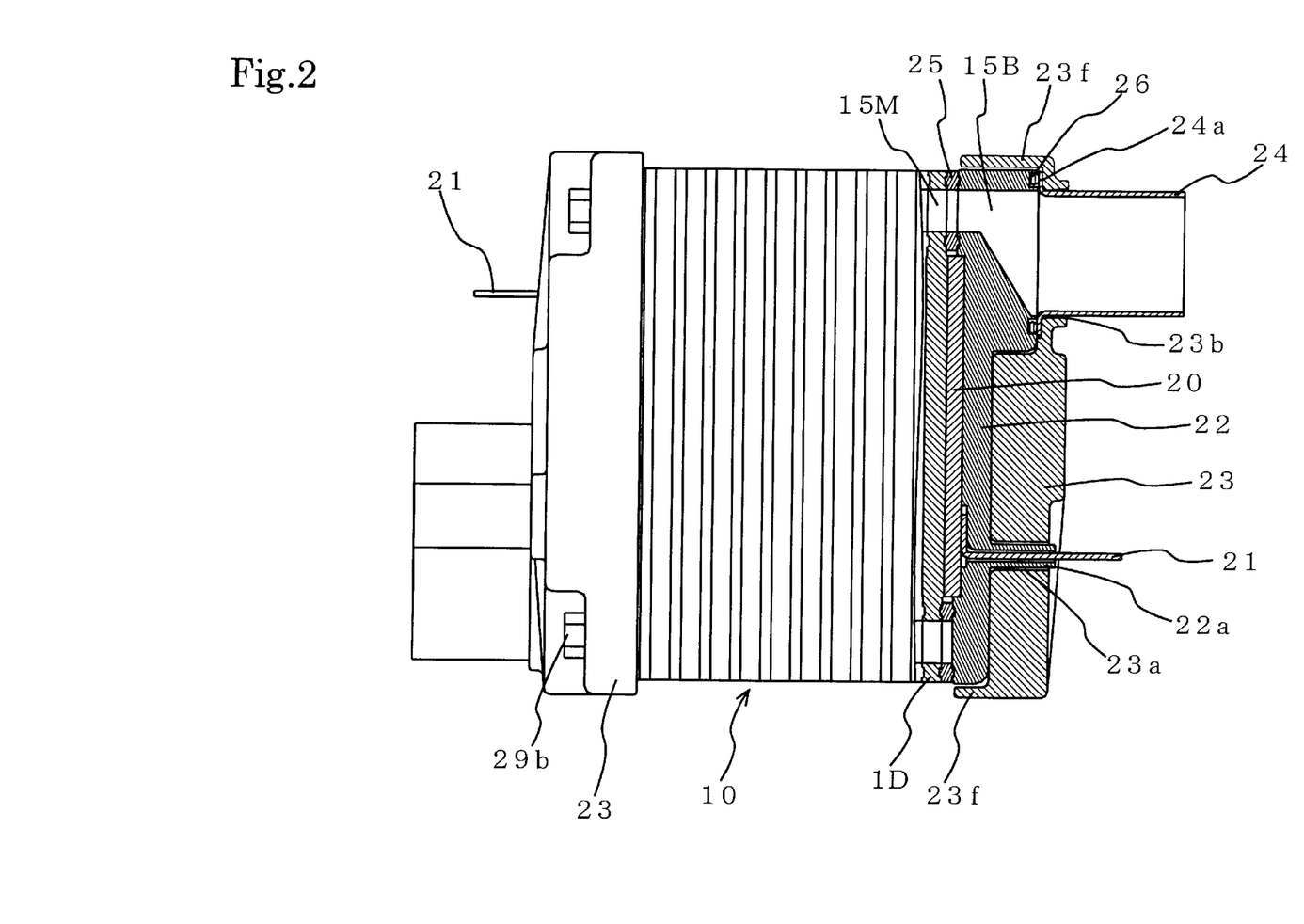
FIG. 2 is a partial cross sectional view illustrating a fuel cell of an embodiment according to this invention.
Figure 3:
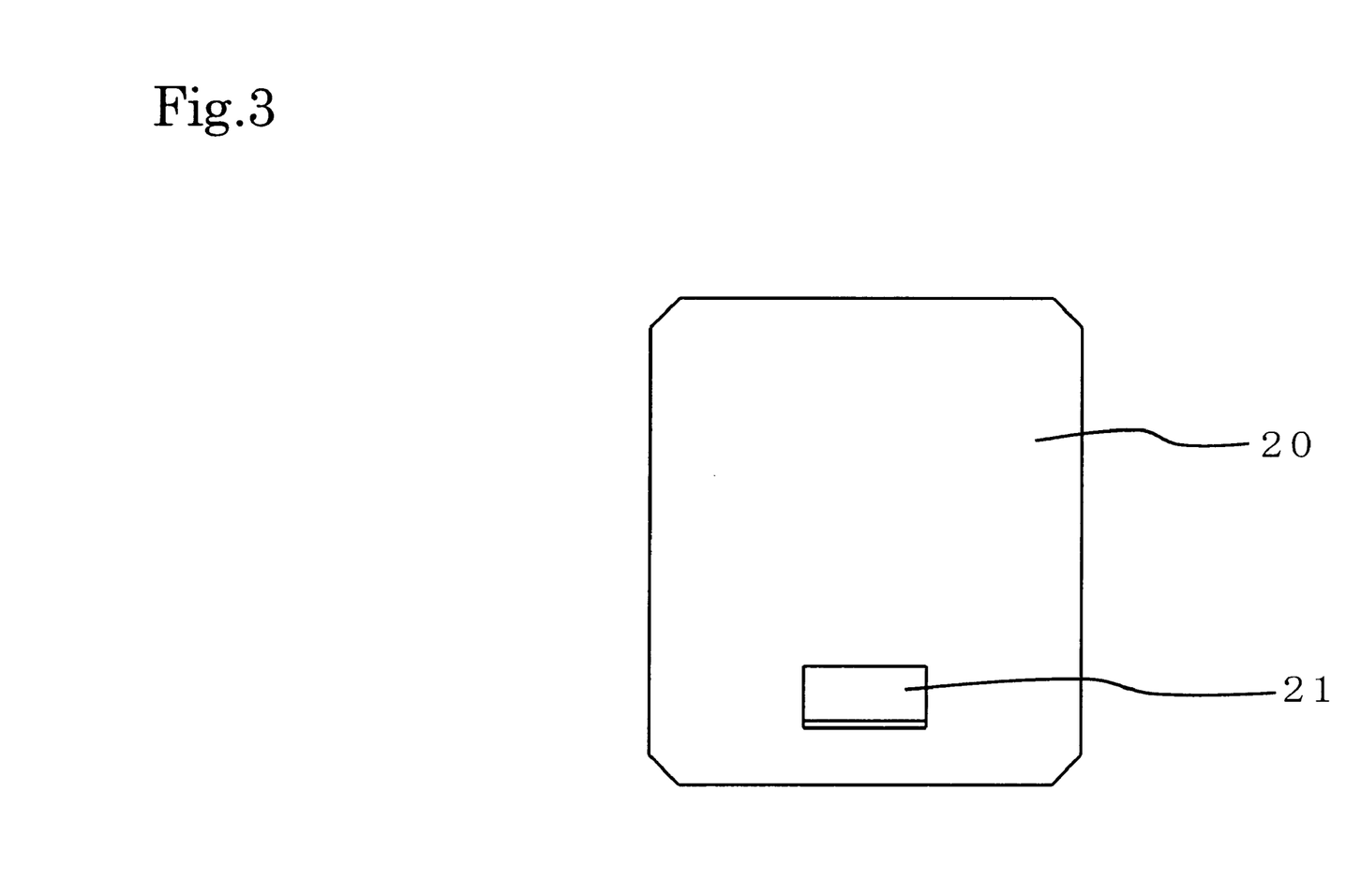
FIG. 3 is a top plan view of a current collection plate of the embodiment of this invention.

The current collection plate 20 is the current collection member to be connected with the contact plane 30 of the stack 10. Supply-discharge members 22 are made from poly(phenylene sulfide) having an electric insulating property. The supply-discharge members 22 are provided on the outsides of the current collection plates 20. The current collection plate 20 is held between the supply-discharge members 22 and the stack 10.

The end plates 23 are provided on the outsides of the supply-discharge members 22. The end plates 23 are pressure members made from die casting aluminum alloy. The current collection plates 20 are approximately the same size as the electrodes and are disposed at the inside of the grooves 8.

The current collection plate 20 is connected with an electric terminal 21. The current collection plate 20 and the electric terminal 21 are both made from copper. The electric terminal 21 is L-shaped, and one side plane of the electric terminal 21 is welded on the current collection plate 20.

One of the supply-discharge members 22 includes an oxidizing gas supply passage 15B provided at an upper portion of the supply-discharge member 22 (shown at right side of FIG. 2) in order to link the oxidizing gas supply passage 15B with the oxidizing gas supply manifold 15M. The other of the supply-discharge member 22 includes a corresponding fuel gas supply passage and a coolant supply passage (not shown).

A sheath portion 22a provided on the supply-discharge member 22 surrounds the electric output terminal. The other supply-discharge member includes discharge passages (not shown) linked with fluid discharge manifold at a lower portion of the other supply-discharge member. Another sheath portion is provided on the other supply-discharge member and surrounds the other electric output terminal 21.

Figure 5:
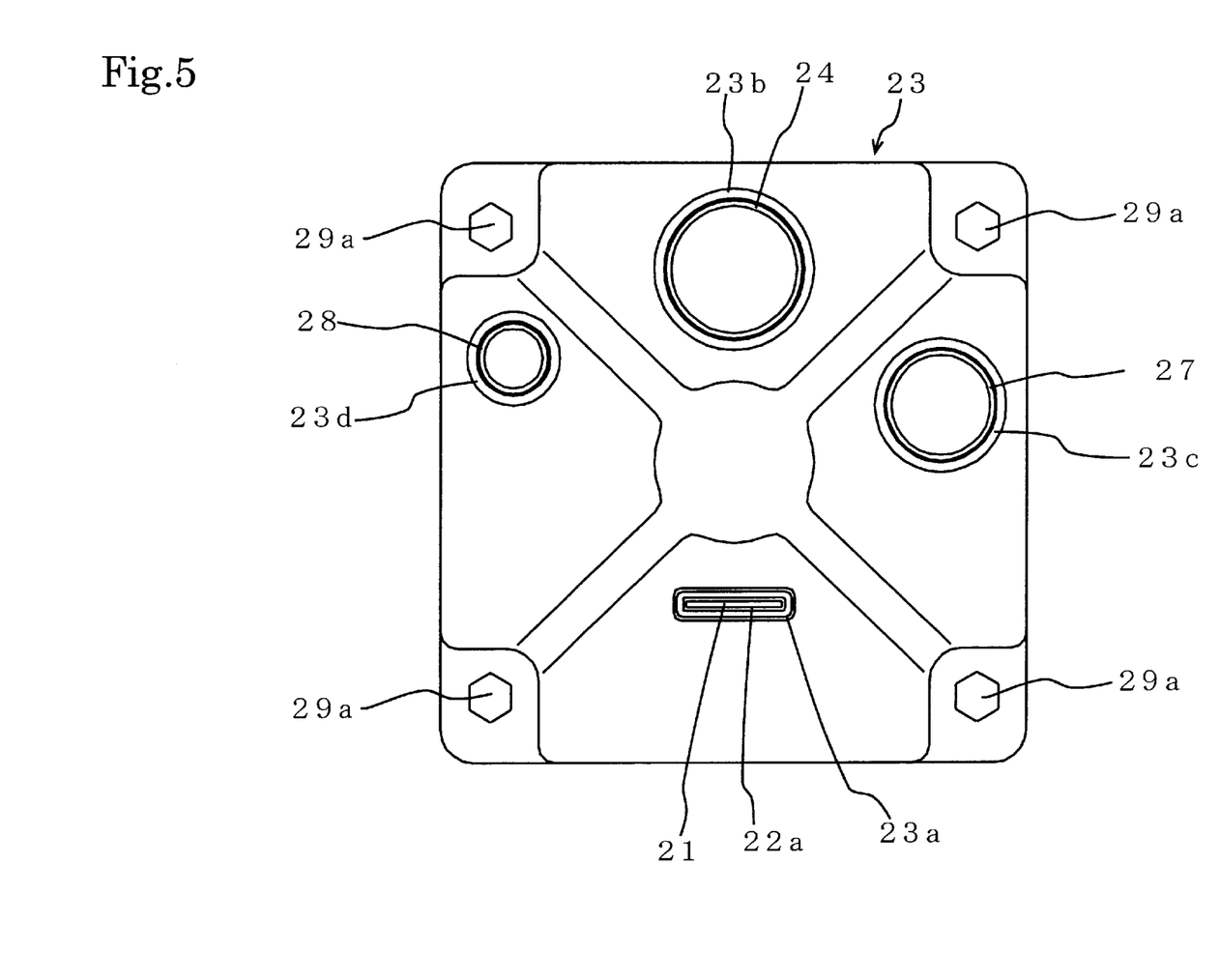
FIG. 5 is a front view of a pressure member of the embodiment of this invention.

Holes 23b, 23c and 23d are provided on one of the end plates 23 (FIG. 5). Supply ports having the flange ports 24, 27 and 28 are respectively linked with the oxidizing gas supply passage 15B, the fuel gas supply passage and the coolant supply passage.

Similar holes (not shown) are provided on the other end plate 23 for other flange ports (not shown). The other flange ports are discharge ports to be linked with fluid discharge passages of the other supply-discharge member 22.

These flange ports are made from stainless steel having a corrosive resistant property.

A hole 23a and an protection portion 23f are provided on the end plate 23. The sheath portion 22a extends through the hole 23a. The protection portion 23f surrounds an outside of the discharge member 22 along the stacking direction of the supply-discharge portion 22. Bolt holes are provided at four corners of the supply-discharge member 22 and the end plate 23 in order to insert the bolts 29b when these components are assembled in the fuel cell.

Hereinafter, an assembling procedure of various parts and components, such as the current collection plate 20, the supply-discharge member 22 and the end plate 23 is described.

First, the separator 1D is arranged at an end portion of the stack 10. The current collection plate 20 is contacted with the contact plane 30 of the separator 1D, and a sealing member 25 is disposed in the groove 8 of the separator 1D. The sealing member 25 is an intercepting means in this embodiment. Secondly, the oxidizing gas supply passage 15B is connected to the oxidizing gas supply manifold 15M. The fuel gas supply passage is connected to the fuel gas supply manifold. The coolant supply passage is connected to the coolant supply manifold. The supply-discharge member 22 is then pushed onto the separator 1D so as to insert the electric output terminal 21 through the sheath portion 22a of the supply-discharge member 22 and so as to enclose the current collection plate 20.

A flange portion 24a of the flange port 24, which is fitted in the hole 23b, is contacted with the supply-discharge member 22 via O-ring 26 so as to connect the flange port 24 with the oxidizing gas supply passage 15B of the supply-discharge member 22.

Similarly, flange portions of the flange ports 27 and 28 are contacted with the supply-discharge member 22 via O-ring 26 so as to connect the flange ports 27 and 28 with the fuel gas supply passage and the coolant supply passage of the supply-discharge member 22.

The end plate 23 having the flange ports 24, 27 and 28 in the respective holes 23b, 23c and 23d is arranged at the outside of the supply-discharge member 22 so that the supply-discharge member 22 is surrounded by the protection portion 23f after the sheath portion 22a of the supply-discharge member 22 is passed through the hole 23a.

Various parts and components shown at the left side in FIG. 2, such as the current collection plate 20, the supply-discharge member 22 and the end plate 23 are arranged similarly. Subsequently, the bolts 29a are inserted in four bolt holes that are provided at four corners of the separator 1A, 1B, 1C and 1D. After that, these parts and components, such as the supply-discharge member 22 and the end plate 23, are fastened by the bolts 29a and nuts 29b. The current collection plates 20, the supply-discharge member 22 and the flange ports 24, 21, 28 are thereby fixed. Simultaneously, the contact resistance between the separator 1D and the current collection plate 20 is reduced. Further, the fluid is sealed hermetically at various sealing portions.

Operation of this embodiment is explained hereinafter. In the fuel cell showing in FIG. 2, oxidizing gas (i.e., air), fuel gas and coolant (i.e., cooling water) are supplied to the fuel cell through the flange ports 24, 27 and 28.

The oxidizing gas supplied to the fuel cell is supplied to the oxidizing gas supply conduit 11b of the separators 1B and 1C through the oxidizing gas supply manifold 15M. At the oxidant electrode 5, a reaction uses oxygen in the oxidizing gas that flows in the oxidizing gas supply conduit 11b. The oxidizing gas that is not used for the reaction is discharged from a lower left-hand side to outside of the fuel cell through the oxidizing gas discharge manifold 16M.

Similarly, the fuel gas being supplied to the fuel cell is supplied to the fuel gas supply conduit 11a of the separators 1A and 1B through the fuel gas supply manifold. At the fuel electrode 6, a reaction uses hydrogen in the fuel gas that flows in the fuel gas supply conduit 11a. The fuel gas that was not used for the reaction is discharged from the lower left-hand side to outside of the fuel cell through the fuel gas discharge manifold.

The coolant supplied to the fuel cell is supplied to the coolant supply conduit 11c of the separators 1A and 1C through the coolant supply manifold. The coolant supplied to the supply conduit 11c maintains appropriate temperature of the fuel cell for efficient electric power generation. Subsequently, the coolant is discharged from the lower left-hand side to outside of the fuel cell through the coolant discharge manifold.

An electromotive force (i.e., approximately from 0.5 to 0.8V) is generated at the electrode unit 3 due to the reactions at the oxidant electrode 5 and the fuel electrode 6 so that the output current can be obtained. A number of the electrode units 3 are stacked in series so as to obtain the total necessary electromotive force. The total electromotive force of the stacked electrode units 3 can be drawn out at the separators 1D arranged at both ends of the stack 10.

The total electromotive force is transmitted to the current collection plate 20 so as to be supplied to an external circuit (not shown) via the electric output terminal 21. The total electromotive force may be consumed by various apparatus such as a motor and auxiliary control apparatus for the electric vehicle.

It is enough for the current collection plates 20 to have the same area as the electrodes 5 and 6 because the electromotive force of the fuel cell is generated only at the electrode 5 and 6. However, the area of the current collection plate 20 can be adjusted so that the current collection plate 20 will not prevent the fluids from flowing.

The minimum area of the current collection plate 20 cannot be limited specifically. However it is preferable that area of the current collection plates 20 is larger than 60% of area of the electrodes 5 and 6. In view of preferable balance between current collecting efficiency and the cost, the area of the current collection plates 20 may be approximately equal to the area of the electrodes 5 and 6. Hereby, the current collection plates 20 can be smaller than prior current collection plates, and the cost for producing the fuel cell can be reduced.

Since the current collection plate 20 is separated from the fluids by the sealing member 25 as the intercepting means, the current collection plate 20 never contacts the oxidizing gas, the fuel gas or the coolant. Thus, the current collection plate 20 not corroded, and the reliability of the fuel cell can be increased. Also, the current collection plate 20 may be made from metal having an excellent conducting property. Thus the power loss of the fuel cell can be reduced and the electric power generation efficiency can also be improved.

Since the current collection plate 20 may be made from a low cost material such as aluminum, iron or copper, and since the current collection plate 20 does not need to have a coating with a high corrosive resistant property, the cost for producing the fuel cell can be reduced.

Further, a conventional current collection plate needs sealing members as gaskets on both sides. In this invention, however, these sealing members are not necessary. Accordingly, the structure of the fuel cell can be simplified and the cot for producing the fuel cell can be reduced.

Although the electric output terminal 21 protrudes, in the stacking direction of the stack 10, through the supply-discharge member 22, the shape and the protruding direction of the electric output terminal 21 is not limited to this embodiment as long as the electric output terminal 21 is separated from all of the fluids.

For example, the electric output terminal 21 may be formed integrally with the current collection plate 20 and the electric output terminal 21 may protrude in an orthogonal direction to the stacking direction of the stack 10.

Figure 6:
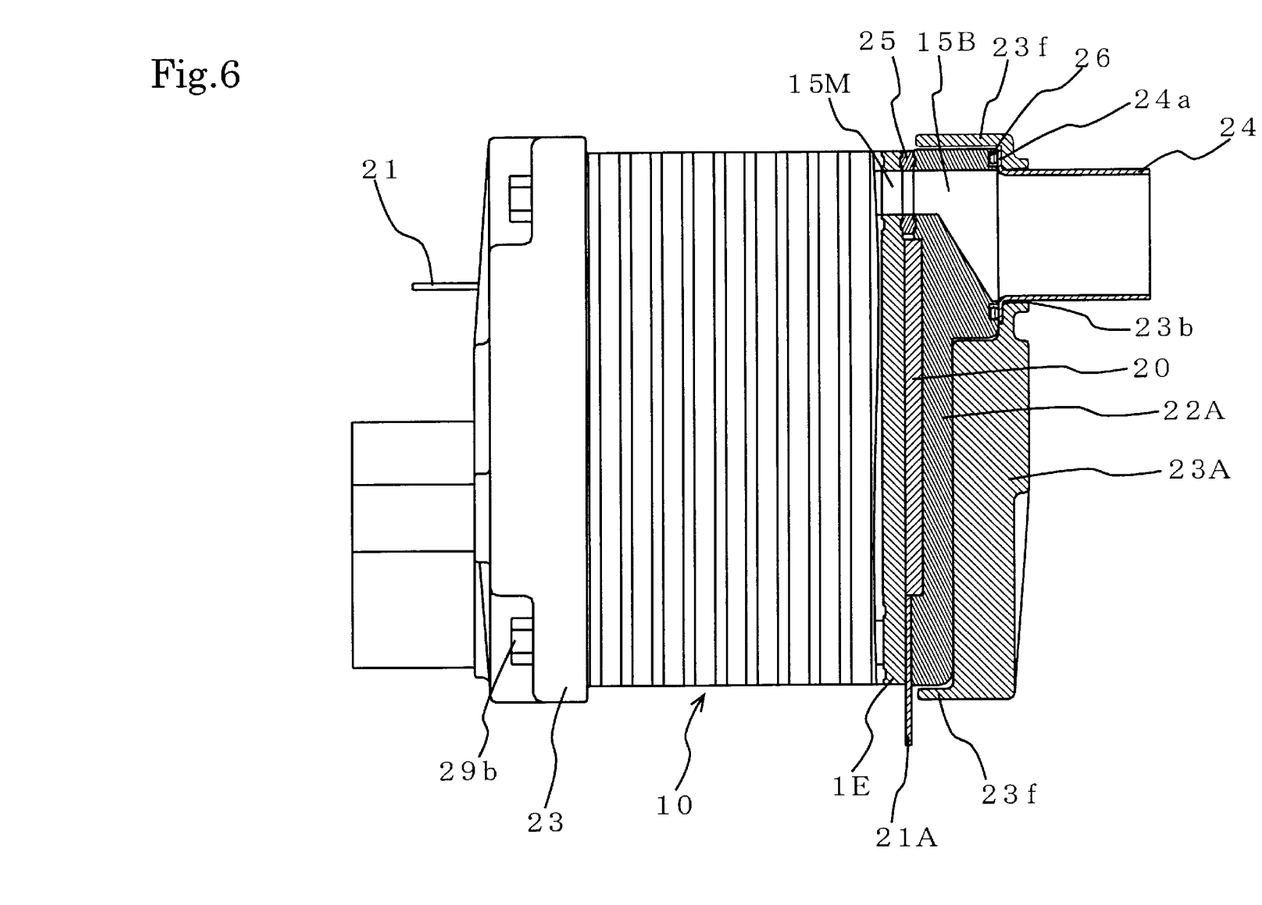
FIG. 6 is a partial cross sectional view of a modified embodiment of this invention that has an electric output terminal with a different shape.

FIG. 6 is a partial cross sectional view of the second embodiment of this invention that has an electric output terminal with a different shape. The second embodiment has the same structure as the first embodiment except for the shape of the separator 1E, the electric output terminal 21A, the supply-discharge member 22A and the end plate 23A. Therefore, the same numerals are used for the identical members or parts so as to omit the explanation for the second embodiment.

The separator 1E has the same structure as the separator 1D, except that the separator 1E does not have the fuel gas discharge hole 9, the oxidizing gas discharge hole 16 and the coolant discharge hole 18. The electric output terminal 21A is formed integrally with the current collection plate 20 and is protruded in a lateral (e.g., downward) direction of the fuel cell. The protruded direction of the current collection plate 20 may be selected depending an application of the fuel cell as long as the current collection plate 20 is separated from each fluid. For example, the current collection plate 20 may be protruded from the side of the fuel cell.

The current collection plate 20 is pressed by the supply-discharge member 22A toward the separator 1E as the first embodiment. The supply-discharge member 22A is pushed by the end plate 23A as the first embodiment. In the second embodiment, since it is not necessary to provide the sheath portion 22a on the supply-discharge member 22A and to provide the hole 23a in the end plate 23A, the structure of these members can be simplified.

In the second embodiment, since the other electrode is surrounded by the fluid supply hole and the fluid discharge hole, the electric output terminal 21 cannot be protruded to the side direction of the fuel cell if the electric output terminal is to be separated from each fluid. So only the electric output terminal 21A is protruded from the side of the supply-discharge member 22 to the outside of the fuel cell, and the electric output terminal 21A is protruded to the outside of the fuel cell while separated from the fluid.

Since it is hard to corrode, a metal having an excellent electrical conducting property can be used for the electric output terminal. Thus the resistance loss of the fuel cell can be reduced. If the electric output terminal 21 is made from metal, the resistance can be reduced between the electric output terminal 21 and the external circuit. Further, if the electric output terminal 21 is made from metal, the electric output terminal 21 is hard to break.

If the electric output terminal 21 is protruded in the side direction of the fuel cell, the current collection portion is spaced far away from the electric output terminal 21, so that a voltage difference may occur between the current collection portion close to the electric output terminal 21 and the current collection portion away from the electric output terminal 21. Accordingly it is necessary to reduce the resistance of the current collection member so as to minimize this difference. Thus, it is necessary to make the current collection member 20 thicker.

However, if the electric output terminal 21 can be protruded from the inside the supply-discharge member to the outside of the fuel cell as the second embodiment, the electric output terminal 21 can be provided closer to the center of the current collection member 20. Thus, due to the short length of the current collection portion and the electric output terminal 21, the current collection member 20 can be thinned.

In the embodiment employing the electric output terminal 21 protruded outside the stack in the stacking direction of the stack, the electric output terminal 21 can be simply extended through a hole provided in the supply-discharge member 22 along the stacking direction of the stack. Therefore, the fuel cell may be manufactured at low cost.

Although the supply-discharge members 22 and 22A are made from the PPS having electrically insulating property in the above descried embodiments, any material other than the PPS may instead be used for the supply-discharge members 22 and 22A, as long as such material has electrically insulating properties, heat resisting properties and chemical resisting properties. However, thermoplastic resin, such as phenol resin, epoxy resin or thermosetting resin, such as PPS, denatured poly(phenylene oxide) resin are suitable for the material of the supply-discharge members 22 and 22A. These material can be made in the complex shape of the supply-discharge members 22 and 22A, with the supply passage, the discharge passage and the sheath portion 22a, at low cost. In these materials, the PPS of this embodiment is the most suitable due to its excellent heat resisting property and excellent chemical resisting property.

Although the supply-discharge member 22 is formed integrally with the sheath portion 22a in this embodiment, these can be formed separately. In this case, the electric output terminal is also protruded from the inside of the supply-discharge member to the outside of the fuel cell.

In these embodiments, although the flange ports 24, 27, 28 are separated from the supply-discharge members 22, 22A and are used for the supply port or the discharge port, the supply port or the discharge port can be formed integrally with the supply-discharge members 22 and 22A. However, if the supply port or the discharge port is formed separately from the supply-discharge members 22 and 22A, the material of the supply port or the discharge port can selected separately. Thus, this material can be selected after consideration of connectivity to the supply port, the discharge port and the external pipe, and the strength required for this connection.

The supply port or the discharge port is not limited to the flange type port. For example, a threaded type port is also applicable. However, it is necessary for the port to have excellent corrosive resistance properties since a corrosive fluid is flowed through the port. Since the shape of the flange port is designed to be produced easily using a corrosive resistant material such as stainless steel, the production cost for the supply port or the discharge port can be reduced with excellent corrosive resistant properties.

Although the supply-discharge members 22 and 22A may be used for the pressure member instead of the end plates 23 and 23A, it is advantageous for the supply-discharge members 22 and 22A to be separated from the end plates 23 and 23A because the best material can be selected for the pressure member with sufficient strength and rigidity to hold the internal pressure generated in the fuel cell. Besides, if the supply-discharge member and the pressure member are separated, the pressure member (i.e., the end plates 23 and 23A) may be also used to press the flange portion 24a of the flange port 24 toward the supply-discharge member 22.

Since the protection portion 23f is provided on the end plates 23 and 23A to surround the supply-discharge member 22, the supply-discharge member 22 is not easily damaged by high internal pressure.

Since the electric output terminal is inserted in the sheath portion 22a of the supply-discharge member 22 and the sheath portion 22a is extended through the hole 23a provided in the pressure member 23, aluminum alloy or an iron alloy that does not have insulating properties can be used for the material of the pressure member. Thereby, the pressure member can have excellent strength and rigidity against high internal fluid pressures. Besides a pressure member having a complex shape can be produced, and an engineering plastic having enough strength and rigidity for the pressure member can be used.

It is intended that the foregoing detailed description be regarded as illustrative rather than limiting and that it is understood that the following claims including all equivalents are intended to define the scope of the invention.

What is claimed is:

1. A fuel cell comprising:
   a stack comprising a plurality of unit cells, each said unit cell comprising an electrode unit held by separators, each said electrode unit comprising a solid polymer electrolyte membrane held by a pair of electrodes;
   fluid passages extending through the stack in a stacking direction of the stack;
   an insulating supply-discharge member having a fluid passage communicating with at least one of the fluid passages extending through the stack;
   a current collection member held between the supply-discharge member and the stack;
   an isolating element positioned to fluidically isolate the current collection member from a fluid in the fluid passage of the supply-discharge member and from the fluid passages extending through the stack.

2. The fuel cell according to claim 1, further comprising an electric output terminal connected to the current collection member and protruding outside the fuel cell by passing through the supply-discharge member.

3. The fuel cell according to claim 2, wherein the electric output terminal protrudes outside the fuel cell in the stacking direction of the stack.

4. The fuel cell according to claim 1, wherein the fuel cell further comprises a flange port abutting the supply-discharge member and fluidically communicating with the fluid passage of the supply-discharge member, and wherein the fuel cell further comprises a pressure member pressing the supply-discharge member toward a center of the stack and pressing the flange port toward the supply-discharge member.

5. The fuel cell according to claim 4, wherein the supply-discharge member comprises a sheath portion housing the electric output terminal, wherein the sheath portion penetrates the pressure member.

6. The fuel cell according to claim 4, wherein the supply-discharge member comprises a sheath portion housing the electric output terminal.

7. The fuel cell according to claim 1, further comprising a pressure member having a protection portion covering at least part of the supply-discharge member.

8. The fuel cell according to claim 2, further comprising a pressure member having a protection portion covering at least part of the supply-discharge member.

9. The fuel cell according to claim 3, further comprising a pressure member having a protection portion covering at least part of the supply-discharge member.

10. The fuel cell according to claim 4, wherein the pressure member comprises a protection portion covering at least part of the supply-discharge member.

11. The fuel cell according to claim 5, wherein the pressure member comprises a protection portion covering at least part of the supply-discharge member.

12. The fuel cell comprising:
    a separator having at least one passage for flowing either one of a fuel gas, an oxidization gas and a coolant;
    an electrode unit having a pair of electrodes and a electrolyte held between the electrodes;
    a unit cell comprised of the separators and the electrode unit held by the separators;
    a stack formed of a plurality of the unit cells;
    a fluid passage extended along a stacking direction of the stack for flowing at least one of the fuel gas, the oxidizing gas and coolant;
    an insulated supply-discharge member provided at at least one end of the stack for supplying and discharging the fuel gas, the oxidizing gas and the coolant for the fluid passage;
    a current collection member held between the supply-discharge member and the stack;
    an isolating element positioned to fluidically isolate the current collection member from a fluid in the fluid passage of the supply-discharge member and from the fluid passages extending through the stack.

13. The fuel cell according to claim 1, further comprising an electric output terminal connected to the current collection member and protruding outside the fuel cell by passing through the supply-discharge member.

14. The fuel cell according to claim 12 further comprising: an electric output terminal protruded outwardly from the stack in the stacking direction of the stack.

15. The fuel cell according to claim 12 further comprising: a supply port having a flange port; and
    an exhaust port having another flange port;
    wherein the flange ports are abutted against the supply-discharge member so as to flow the fluid through the supply port and the exhaust port.

16. The fuel cell according to claim 15 further comprising:
    a pressure member pressing the supply-discharge member toward a center of the stack and pressing the flange ports toward the supply-discharge member.

17. The fuel cell according to claim 16 further comprising:
    an electric output terminal protruded outwardly from the stack in the stacking direction of the stack;
    wherein the supply-discharge member comprises a sheath portion extending through the pressure member and housing the electric output terminal.

18. The fuel cell according to claim 16 wherein the pressure member comprises a protection portion covering at least a part of the supply-discharge member.

19. A fuel cell comprising:
    a stack comprising a plurality of unit cells, each said unit cell comprising an electrode unit held by separators;
    fluid passages extending through the stack in a stacking direction of the stack;
    an insulating supply-discharge member having a fluid passage communicating with at least one of the fluid passages extending through the stack;
    a current collection member held between the supply-discharge member and the stack;
    isolating means for fluidically isolating the current collection member from a fluid in the fluid passage of the supply-discharge member and from the fluid passages extending through the stack.

20. The fuel cell according to claim 19, further comprising electric output terminal means for supplying electricity produced in the fuel cell to an outside of the fuel cell.

21. The fuel cell according to claim 20, wherein the electric output terminal means protrudes outside the fuel cell in the stacking direction of the stack.

22. The fuel cell according to claim 19, wherein the fuel cell further comprises pressure means for pressing the supply-discharge member toward a center of the stack and pressing the flange port toward the supply-discharge member.

* * * * *